United States Patent
Klaen et al.

(10) Patent No.: US 9,920,838 B2
(45) Date of Patent: Mar. 20, 2018

(54) BRUSH SEAL

(71) Applicant: MTU Aero Engines AG, Munich (DE)

(72) Inventors: Stephan Klaen, Berlin (DE); Julian Weber, Munich (DE); Frank Stiehler, Bad Liebenwerda (DE); Christoph Cernay, Bruckmuehl (DE); Thomas Hess, Munich (DE)

(73) Assignee: MTU Aero Engines AG, Munich (DE)

( * ) Notice: Subject to any disclaimer, the term of this patent is extended or adjusted under 35 U.S.C. 154(b) by 26 days.

(21) Appl. No.: 14/790,663

(22) Filed: Jul. 2, 2015

(65) Prior Publication Data

US 2016/0003360 A1    Jan. 7, 2016

(30) Foreign Application Priority Data

Jul. 4, 2014    (DE) .................. 10 2014 213 044

(51) Int. Cl.
| | |
|---|---|
| *F01D 11/02* | (2006.01) |
| *F16J 15/3288* | (2016.01) |
| *F01D 11/00* | (2006.01) |
| *F16J 15/322* | (2016.01) |
| *F16J 15/3268* | (2016.01) |

(52) U.S. Cl.
CPC ........... *F16J 15/3288* (2013.01); *F01D 11/00* (2013.01); *F01D 11/001* (2013.01); *F16J 15/322* (2013.01);
(Continued)

(58) Field of Classification Search
CPC .... F16J 15/3288; F16J 15/322; F16J 15/3268; F01D 11/00; F01D 11/001;
(Continued)

(56) References Cited

U.S. PATENT DOCUMENTS

| | | | |
|---|---|---|---|
| 5,308,088 A | 5/1994 | Atkinson et al. | |
| 6,030,175 A | * 2/2000 | Bagepalli | ............. F16J 15/3288 |
| | | | 277/355 |

(Continued)

FOREIGN PATENT DOCUMENTS

| | | |
|---|---|---|
| DE | 600 04 772 T2 | 7/2004 |
| EP | 1 018 613 A2 | 7/2000 |

(Continued)

OTHER PUBLICATIONS

European Search Report issued in European counterpart application No. 15169529.3-1751 dated Nov. 24, 2015, with statement of relevancy (Nine (9) pages).

(Continued)

*Primary Examiner* — Nathan Cumar
(74) *Attorney, Agent, or Firm* — Crowell & Moring LLP (57) ABSTRACT

A brush seal for a gas turbine, in particular an aircraft engine, is disclosed. The brush seal includes a support ring which has a support plate and a support structure, where the support structure is arranged downstream with respect to the support plate. The brush seal also includes bristles which are arranged upstream with respect to the support ring, where ends of the bristles protrude radially inward beyond the support plate. The support structure yields when a scraping force acting radially outward occurs on a first lateral surface of the support structure, where the first lateral surface is directed radially inward, and the support structure does not yield when an axial operating force occurs on a second lateral surface of the support structure.

7 Claims, 5 Drawing Sheets

(52) U.S. Cl.
CPC ....... *F16J 15/3268* (2013.01); *F05D 2220/32* (2013.01); *F05D 2240/56* (2013.01); *F05D 2250/132* (2013.01); *F05D 2250/22* (2013.01); *F05D 2250/283* (2013.01); *F05D 2250/294* (2013.01)

(58) Field of Classification Search
CPC ........... F05D 2220/56; F05D 2250/132; F05D 2250/22; F05D 2250/283; F05D 2250/294; F05D 2220/32; F05D 2240/56
USPC ........................................ 277/355; 415/173.7
See application file for complete search history.

(56) References Cited

U.S. PATENT DOCUMENTS

| | | | |
|---|---|---|---|
| 6,695,314 B1 * | 2/2004 | Gail | F01D 11/001 |
| | | | 277/355 |
| 7,604,242 B2 | 10/2009 | Adis et al. | |
| 7,644,928 B2 * | 1/2010 | Beichl | F16J 15/3288 |
| | | | 277/355 |
| 2002/0105146 A1 * | 8/2002 | Uehara | F16J 15/3292 |
| | | | 277/355 |
| 2006/0038351 A1 | 2/2006 | Rupp et al. | |
| 2008/0122183 A1 | 5/2008 | Braun et al. | |

FOREIGN PATENT DOCUMENTS

| | | |
|---|---|---|
| EP | 1 116 906 B1 | 7/2001 |
| EP | 1 653 129 A1 | 5/2006 |
| EP | 1 707 856 A1 | 10/2006 |
| EP | 1 947 297 A2 | 7/2008 |

OTHER PUBLICATIONS

German-language Office Action dated Sep. 8, 2014 (Five (5) pages).

* cited by examiner

Figure 1

(Prior art)

BRUSH SEAL

This application claims the priority of German Patent Application No. DE 10 2014 213 044.1, filed Jul. 4, 2014, the disclosure of which is expressly incorporated by reference herein.

BACKGROUND AND SUMMARY OF THE INVENTION

The invention relates to a brush seal for a gas turbine, in particular an aircraft engine.

Brush seals are used in particular to prevent or at least substantially reduce leakage between a stationary part (hereinafter also called a stator) and a rotating part (hereinafter also called a rotor). A known brush seal comprises a wire ring with the bristles placed around it. A c-shaped clamping ring is often used for affixing the bristles to the wire ring. The bristles usually lie in a plane running perpendicular to the axis of rotation of the rotating part. In order for the bristles not to be axially displaceable—based on the axis of rotation of the rotating part—toward the side where the lower pressure prevails, i.e., toward the downward pressure side, a means of fixation must be provided. To do so, a sufficiently stable annular support plate is arranged on the downstream side of the bristles. The annular support plate must be designed to be shorter than the bristles in the radial direction toward the rotating part so that there is a clearance between the lower edge of the support plate and the rotating part. In contrast with that, the bristles scrape along the surface of the rotor.

Figure 1:
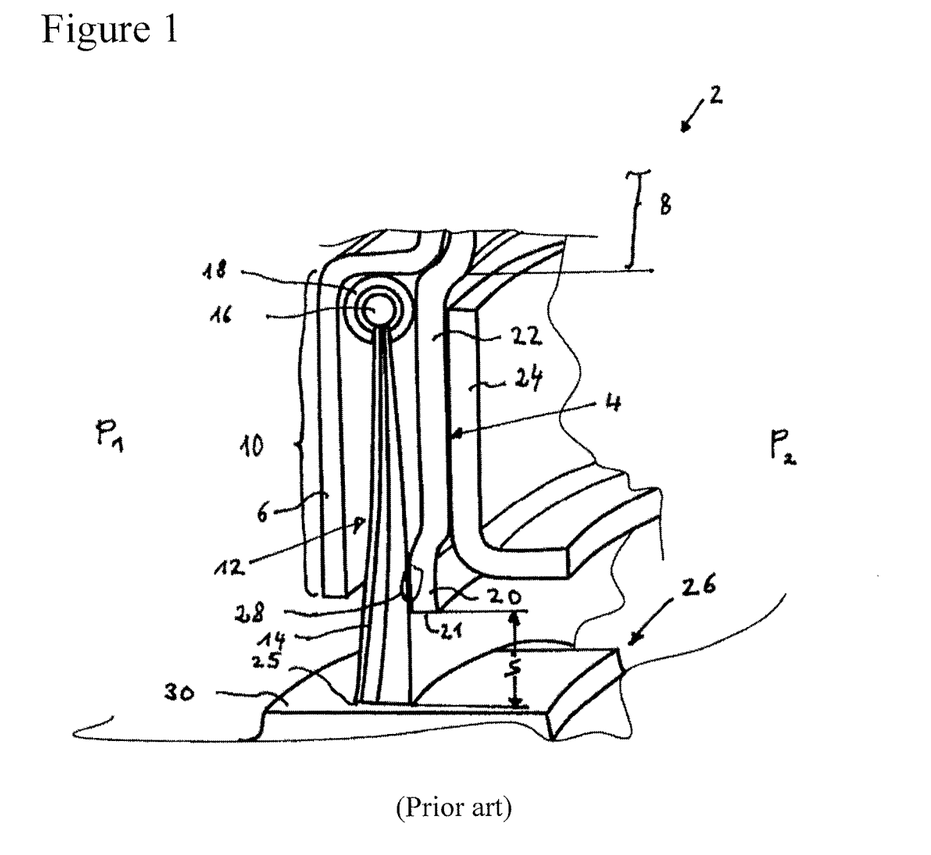
FIG. 1 shows a meridian section through a state-of-the-art brush seal.

Such a brush seal, which is known from the prior art, is illustrated in FIG. 1, for example. FIG. 1 shows a meridian section, based on the axis of rotation of the rotor (not shown here) through a brush seal 2. In the diagram in FIG. 1, the flow is from left to right, so that the pressure $p_1$ in FIG. 1 is higher at the left of the brush seal than the pressure $p_2$ at the right of the brush seal. The brush seal 2 comprises a support ring 4 extending essentially radially in this sectional view and an annular holding plate 6, which extends essentially radially, and they are connected to one another in the radially outer region 8. In the radially inner region 10 between the support ring 4 and the holding plate 6 a receptacle 12 is provided for the bristles 14. These bristles 14 are coiled around a wire ring 16 and are held on the wire ring 16 by a c-shaped clamping ring 18. The elements 14 to 18 are arranged in the receptacle 12 in such a way that the clamping ring 18 is clamped by the support ring 4 and the holding plate. The support ring 4 has a stiff annular support element 20 directed inward radially, with a lateral surface 21 directed inward radially and an annular mounting plate 22 arranged on the outside radially from the support element 20 and offset therefrom in the downstream direction. The mounting plate 22 is connected here on its downstream side to an L-shaped stator section 24. The bristles 14 protrude radially inward over the lateral surface 21, so that the radially inward directed end 25 of the bristles 14 scrape against the surface 30 of a rotor 26. A central region 28 of the bristles 14 is in contact with the support element 20. A clearance S is provided between the lateral surface 21 of the support element 20 and the surface 30 of the rotor 26.

In the event of damage to the gas turbine, the rotor can shear off radially to a much greater extent than would be expected during normal operation. This may occur in particular when a rotor blade breaks off from the rotor, for example, when a bird strike results in loss of a fan blade in an aircraft engine. Then the rotor is no longer balanced, so the motion of the rotor around its original axis of rotation becomes eccentric. Then, if the clearance S between the support element and the rotor has been designed to be very small, this may result in damage to the rotor because the support element cuts into the rotor. In the worst case, this may result in breakage of the rotor. To reduce the damage to the rotor, the lateral surface of the support plate may be coated accordingly. However, only very small layer thicknesses are possible here. However, if the clearance between the support element and the rotor has been designed to be too large, this increases the bundle leakage so that the sealing effect and thus also the efficiency of the gas turbine are reduced.

The present invention is thus based on the object of providing a brush seal that will not damage the rotor in a damage incident involving the gas turbine and at the same time will offer the best possible sealing effect during normal operation.

The invention relates to a brush seal for a gas turbine, in particular an aircraft engine having at least one support ring, which has a support plate and a support structure, in particular an annular support structure that is arranged downstream with respect to the support plate and having a plurality of bristles, which are arranged upstream with respect to the support ring and whose ends protrude radially inward beyond the support plate. The support structure is designed here so that, on occurrence of a scraping force acting radially outward on the lateral surface of the support structure facing radially inward, the latter will yield, preferably with a spring elastic effect, whereas, when an axial operating force occurs on at least one of the lateral surfaces of the support structure, the latter will withstand this axial operating force.

This support structure is designed so that with a scraping force acting on it radially from the rotor, it yields, preferably with a spring elastic property, without exerting any mentionable opposing force on the rotor, for example an opposing force of less than 100N, preferably less than 50N, more preferably less than 10N. In contrast with that, the support structure does not yield to any mentionable extent or at all when an axial operating force occurs according to the invention. In other words, in the axial direction, the support structure has a stiffness many times greater than its stiffness in the radial direction (the term "axial direction" as used here is always understood to refer to the axis of rotation of the gas turbine, whereas the radial direction is a direction orthogonal to the axial direction). The stiffness of the support structure in the axial direction in particular may be greater than that in the radial direction by a factor of at least 10, preferably at least 100, more preferably at least 1000.

This is advantageous in particular because the brush seal according to the invention thus has a scraping-tolerant design. The previous approaches prevent any scraping contact. Thus the clearance between the rotating part and the support plate may be designed to be as small as possible. The minimal clearance can also occur due to shrinkage in the initial operation of the turbine. This ensures the least bundle leakage.

The support plate, which serves in particular to support the bristles in the axial direction, may be designed to be much thinner than the support structure in comparison with the support structure adjacent to it in the axial direction (i.e., having a smaller extent in the axial direction), preferably less than half as thick, more preferably less than $\frac{1}{5}^{th}$ as thick, even more preferably less than $\frac{1}{10}^{th}$ as thick as the support structure. This is made possible because when the bristles adjacent to the support plate on the upstream side exert an axial force on it, so that the bristles can be supported on the support structure adjacent to them downstream; this support structure is designed to be stiff in the axial direction accordingly. This makes it possible for the support plate to be designed so that it will yield due to shearing, bending, scraping, and/or melting in particular as soon as a scraping force directed radially outward from the rotor of the gas turbine acts on the support plate, without any mentionable counterforce acting on the rotor of the gas turbine and in particular without damage to the rotor of the gas turbine, in particular notching. As described in the introduction—this case occurs easily otherwise with known brush seals for gas turbines in an emergency, for example when there is a great imbalance due to loss of a fan blade because of a bird strike, when a rotating component is deflected too much radially and comes in contact with the support plate. Furthermore, the support plate may be closed or slotted. In addition, the support plate may be segmented.

It is advantageous to place the support structure behind the support plate, as seen in the direction of flow, because this offers the option of reinforcing the support plate in the axial direction of loading (i.e., in the direction of flow) by the support structure. Thus the support plate can be designed with smaller dimensions in the axial direction, for example, and can thus be designed to be softer in the radial direction.

Furthermore, since the clearance between the rotor of the gas turbine and one end of the support plate, which is directed radially inward, can be designed to be so small, the support plate significantly improves the sealing function of the brush seal, whereas the supporting function in the axial direction can be handled by the support structure. As described previously, the support plate can be designed to be very narrow in the axial direction and will thus yield much more easily by abrasion and/or melting when an outward directed radial force occurs. Therefore, there is hardly any notching effect of the support plate on the rotor. In particular, the support plate and the support structure may be constructed of different materials. During operation, the support plate may be in contact with the support structure.

The support structure may be made of a flexible material. The support structure here may be designed with open pores and/or may be made of a sintered material. Narrow mesh structures and/or honeycombs are also conceivable.

In another advantageous embodiment of the invention, there is a clearance between the support structure and the support plate. Furthermore, the support structure may run essentially parallel to the support plate or the support structure may be arranged on the support plate. The support plate and the support structure here may be integrally molded (form fitting, physically bonded or force locking).

This is advantageous in particular because the axial stiffness of the entire support ring can be adjusted by a clearance.

In another advantageous embodiment of the invention, the support structure has a plurality of ribs situated in a plane running essentially radially, these ribs being inclined in at least some sections at an angle ($\beta$) with respect to the radial direction, such that the angle ($\beta$) is preferably between 10° and 40°. The ribs may extend further in the axial direction than in the peripheral direction.

In another advantageous embodiment of the invention, the bristles form an angle of 40° to 60° with the radial direction. As soon as the ribs are inclined to the radial direction, their radially inner ends can yield more easily in the radially outward direction. The radial stiffness can be adjusted through the degree of rib inclination. The ribs of the support structure and the bristles are preferably inclined in different directions with respect to the radial direction.

In another advantageous embodiment of the invention, at least one of the ribs is designed like a spring and/or at least one of the ribs runs in a straight line.

The spring-type design of the rib offers the possibility of the rib being elastically deformable in the radial direction. The ribs may be c-shaped or designed with a zigzag shape. A rib running in a straight line with an inclination to the radial direction also has a certain elasticity. The end positions of the ribs and/or the locations where the rib experiences a change in direction may act like solid-state joints which promote the spring property of the rib.

In another advantageous embodiment of the invention, an inner cover band is integrally molded on at least one rib directed radially inward. A plurality of ends of the corresponding ribs pointing radially inward may be integrally molded on an annular inner cover band.

As an alternative to this, each rib of the support structure may have its own inner cover band. Then the radial inner end of the rib may be arranged between the ends of the inner cover band arranged in the circumferential direction or the radial inner end of the rib is arranged on one end of the inner cover band arranged in the circumferential direction. For example, two, three or up to 40 ribs may also share an inner cover band, i.e., five radially inward directed ends of the corresponding five ribs may be integrally molded on a single inner cover band. All the inner cover bands are arranged one after the other in the circumferential direction and form a segmented ring. However, the inner cover bands may also form a closed inner ring.

In another advantageous embodiment of the invention, the support ring has an essentially annular mounting plate, which is arranged on the outside radially and on which the radial outer end of the support plate is arranged and/or on which the radial outer end of the support structure is arranged. The mounting plate may be segmented if needed. A brush seal can typically have an annular holding plate, which is arranged downstream from the bristles. Then the support ring and the holding plate clamp a c-shape wire ring with the bristles pointing radially inward.

In addition, preferred exemplary embodiments of the invention are described in greater detail on the basis of the schematic drawings.

DETAILED DESCRIPTION OF THE DRAWINGS

FIGS. 2A through 7 show support rings of different embodiments according to the invention. The various embodiments differ in particular due to the different design of the support structures, which will now be discussed in greater detail below.

Figure 2A:
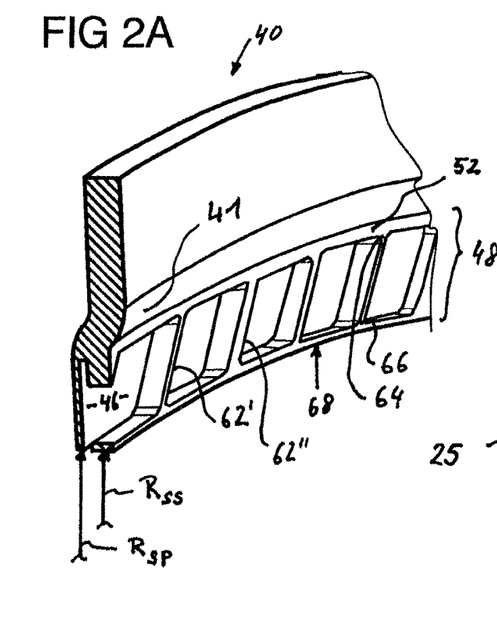
FIGS. 2A-2C show a support ring in a first embodiment according to the invention.
Figure 2B:
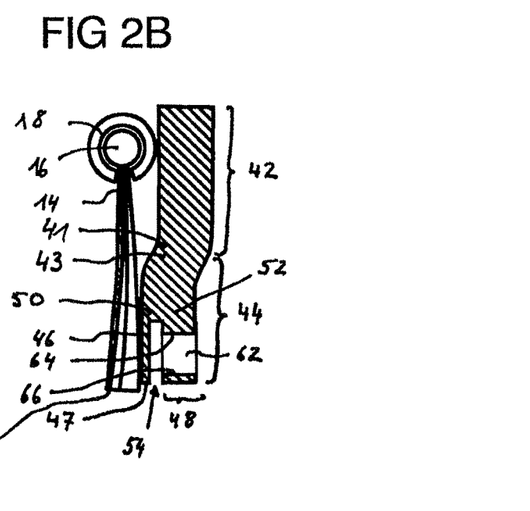
Figure 2C:
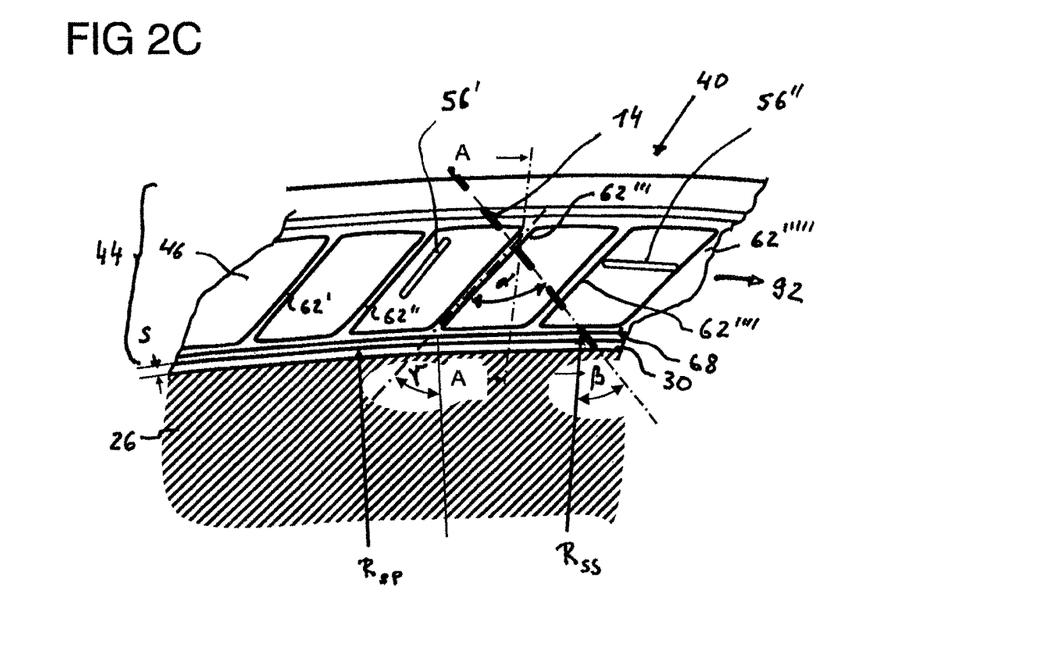
Figure 6:
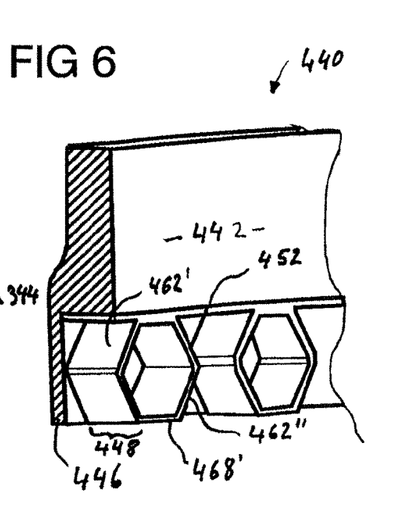
FIG. 6 shows a support ring in a fifth embodiment according to the invention.
Figure 7:
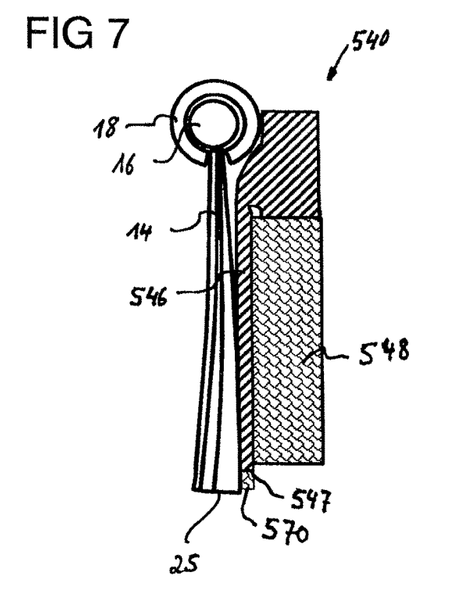
FIG. 7 shows a support ring in a sixth embodiment according to the invention.

FIG. 2A shows a perspective view of a first embodiment of a support ring 40 according to the invention. FIG. 2C shows an axial view along the axis of an engine (not shown) of the first embodiment of the support ring 40 according to the invention from FIG. 2A. FIG. 2B shows a section along line A-A in FIG. 2C. As shown in FIG. 2B, the support ring 40 comprises radially from the outside to the inside an annular mounting plate 42, which may optionally be segmented, and an annular support element 44, which may also optionally be segmented. The radial inner end 41 of the mounting plate 42 is designed to be integral with and/or integrally molded onto the radial outer end 43 of the support element 44. The support element 44 has a support plate 46 upstream and a support structure 48 downstream, wherein their radial outer ends 50, 52 are connected to one another. The support structure 48 may be arranged in a radial extension of the mounting plate 42 (see FIGS. 4B to 7) or the support structure 48 may be arranged with an axial offset from the mounting plate 42. In the latter case, the support structure 48 is preferably arranged at least partially upstream with respect to the mounting plate 42. The inside radius $R_{SP}$ of the support plate 46 may be smaller than the inside radius $R_{SS}$ of the support structure 48. The support structure 48 may be arranged directly on the support plate 46 in the axial direction as illustrated in FIGS. 6 and 7, for example, or the support structure 48 may be at a distance from the support plate 46, so that there is an annular clearance 54 as illustrated in FIGS. 2A and 2B. Thus the support structure 48 is able to move independently of the support plate 46.

The support structure 48 has a plurality of ribs 62', etc., running radially inward, such that each end 64 of the ribs 62' etc. pointing radially outward is integrally molded on the radial outer end 52 of the support structure 48. Each end 66 of the ribs 62' etc. protruding radially outward is integrally molded on an inner cover band, which is designed as an inner ring 68. The inner ring 68 may be a closed partial ring. In particular the partial ring may span 180° of the circumference. Other divisions are also conceivable. Intended breaking points or slots 56' and 56" may be provided in the support plate 46 (see FIG. 2C).

For a better explanation, FIG. 2C shows only a single bristle 14 which runs obliquely at an angle α (approximately 80° here) to the third rib 62''' such that the bristle 14 then forms an angle β (approximately 43° here) to the radial direction $R_{SS}$. The ribs 62' etc. do not run in the radial direction but instead are inclined by the angle γ. The bristle 14 is arranged on the rear side of the support plate 46, i.e., the bristles are arranged upstream with respect to the support plate 46. As already mentioned the support plate 46 may have a slot 56' (running parallel to the ribs 62' etc.) between the second rib 62'' and a third rib 62''' for example. In the support plate 46 according to the exemplary embodiment illustrated in FIG. 2C, another slot 56" (running here in a circumferential direction) is provided between the fourth rib 62'''' and the fifth rib 62'''''.

The rotor 26 (for example, a shaft) is arranged at a distance S beneath the inner ring 68. The distance S denotes the clearance between a lateral surface 47 of the support plate 46 facing radially inward and the surface 30 of the shaft 26, which should be sealed by the brush seal. Then the radial inner end 25 of the bristle 14 sits on the surface 30 of the shaft 26. The shaft 26 can rotate in the direction 92.

This construction thus offers the possibility that the inner ring 68 can yield toward the outside radially in the event of a radial movement of the shaft 26 (obviously up to a certain limit). This is made possible in particular by the fact that the webs 62' etc. run at an angle to the radial direction; they are also designed to be relatively thin (as seen in the circumferential direction of the gas turbine) and the radially inner and outer ends of the ribs 62' etc. act like solid-state joints. The support plate 46 is designed to be significantly thinner in comparison with the support structure 48 and can thus yield easily when the rotor of the gas turbine is scraped, in particular when it is melted or "crumbles," without causing any damage to the rotor. In an emergency, i.e., when a great radial force is applied by the rotor of the gas turbine to the brush seal according to the invention, for example because a fan blade has been broken due to a bird strike and the rotor is thus severely imbalanced, the slots 56', 56" shown in FIG. 2C facilitate an essentially complete breakaway of the support plate 46. The brush seal according to the invention thus has the advantage that the shaft 26 is protected from damage and the clearance S between the radially inner lateral surface 47 of the support plate 46 and the shaft surface 30 can be designed to be relatively small for normal operation.

Figure 3A:
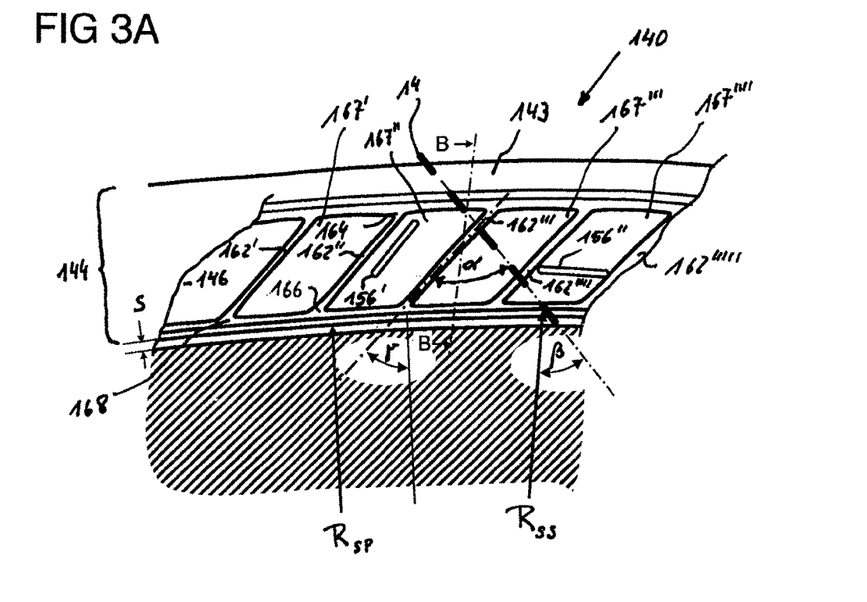
FIGS. 3A-3C show a support ring in a second embodiment according to the invention.
Figure 3B:
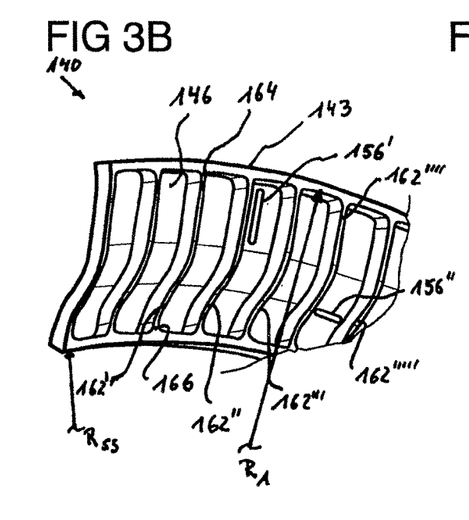
Figure 3C:
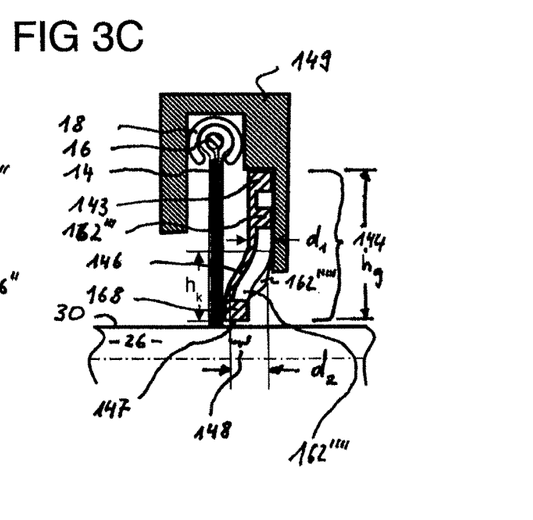

FIGS. 3A to 3C illustrate a second embodiment of a support ring 140 according to the invention. FIG. 3B shows a perspective view of the second embodiment of the support ring 140 according to the invention. FIG. 3A shows an axial view along an axis of the engine (not shown) of the second embodiment of the support ring 140 according to the invention from FIG. 3B. FIG. 3C shows a radial section along line B-B in FIG. 3A.

The support ring 140 has a support element 144. This support ring 140 illustrated in FIGS. 3A to 3C however does not include a mounting plate. As an alternative to that, the support ring 140 may have a mounting plate like that in the first embodiment. The support element 144 has a support structure 148 and a support plate 146. In contrast with the first embodiment shown in FIGS. 2A to 2C, the support structure 148 and the support plate 146 are physically bonded to one another. As an alternative, the support structure 148 may be spaced a distance away from the support plate 146, as shown in FIGS. 2A to 2C.

Only a partial detail of the support ring 140 according to the invention is shown in the perspective view according to FIG. 3B. In this diagram, the front side is the downstream side of a support ring 140. Accordingly, the back side is the upstream side of the support ring 140. The support ring 140 comprises an outer ring 143 with an outside radius $R_A$, which is comparable to the radial outer end 43 of the support element 44 from FIGS. 2A and 2B, and an inner ring 168 having an inside radius $R_{SS}$, which is comparable to the inner ring 68 from FIGS. 2A and 2B. Several ribs 162', 162'', 162''', 162'''', and 162''''' run at an angle γ to the radial direction, based on the axis of rotation of the rotor (not shown), between the outer ring 143 and the inner ring 168. The radial outer ends 164 of the ribs 162' etc. are integrally molded on the outer ring 143. The radial inner ends 166 of the ribs 162' etc. are integrally molded on the inner ring 168. A support plate 146 runs on the back side of the two rings 143 and 168 and the ribs 162' etc. On the front side, individual compartments 167' etc. are formed by the rings 143 and 168 and the ribs 162', etc. These compartments 167', etc., may have slots 156' in the support plate 146.

The first compartment 167', as seen from left to right in FIGS. 3A and 3B, is arranged between the first rib 162' and the second rib 162" and is completely closed in the axial direction on the back side (upstream side) because the support plate 146 is integrally molded directly on the back sides of the ribs 162', etc. The second compartment 167" is arranged between the second rib 162" and the third rib 162'" and is not closed completely in the axial direction on the back side (upstream side) because a first slot 156' is formed in the support plate 146 and runs parallel to the ribs 162', etc. The third compartment 167'" is arranged between the third rib 162'" and the fourth rib 162"" and is closed axially. The fourth compartment 167"" is arranged between the fourth rib 162"" and the fifth rib 162""' and is not closed completely because a second slot 156" running essentially in the circumferential direction is formed in the support plate 146. It should be pointed out here that the slots 156' and 156" may optionally be present in such a way that the orientation and the shape of the slots can also vary. However, the slots preferably do not run parallel to the bristles 14. The compartments 167', etc., are bordered on the outside radially by the outer ring 143 and on the inside radially by the inner ring 168.

FIG. 3C shows a radial section along line B-B in FIG. 3A. The bristles 14 are laid around a wire ring 16 just as done in FIGS. 1 and 2B. A c-shaped clamping ring 18 is used for fixation of the bristles 14 on the wire ring 16. Beneath the clamping ring 18, the support element 144 is arranged on the right side of the bristles 14 in FIG. 3C. The pressure at the left of the brush seal is greater than the pressure at the right of the brush seal. In contrast with FIG. 1, the support element 144 and the clamping ring 18 are held together by an essentially U-shaped pressing element 149. The right surface of the support element 144 in FIG. 3C is in contact with the pressing element 149. The pressing element 149 takes over, among other things, the functions of the mounting plate 22 of a support ring and the holding plate 6 in FIG. 1. The corresponding mounting plates are thus optional in all the exemplary embodiments presented here.

The individual elements of the support ring 140, which are visible in this section along line B-B, will now be discussed in detail below. First, the elements that are outermost radially and then the ones in the middle radially and finally the radial inner elements will be discussed. In FIG. 3C the section along line B-B runs over the entire radial height of the support plate 146 from top to bottom. On the outside radially, the section through the outer ring 143 is illustrated as the first from the support ring 140. Farther toward the inside radially, there follows the section through the third rib 162'". The plane B-B completely intersects the inner ring 168 of the support ring 140 on the inside radially. A lateral surface of the fourth rib 162"" is discernible between the section of the third rib 162'" and the section of the inner ring 168. This rib has a first axial thickness $d_1$. The fourth rib 162"" has a constant axial thickness $d_1$ over the entire radial height of the support ring 140 and follows the contour of the support plate 146. In contrast with that, however, some or all of the ribs may also have different axial thicknesses, depending on the radial height.

Thus, in this second exemplary embodiment, the fifth rib 162""' is still discernible in the background in FIG. 3C because this fifth rib 162""' has a second axial thickness $d_2$, which is greater than the first axial thickness $d_1$ of the fourth rib 162"", so that the downstream edge of the fifth rib 162""' is illustrated farther to the right in comparison with the downstream edge of the fourth rib 162"" in FIG. 3C. Specifically the fifth rib 162""' is guided somewhat toward the inside beneath the height $h_k$ along a radial straight line, so that, when viewed from the inside to the outside, the fifth rib 162""' has a second thickness $d_2$, which is greater than the first thickness $d_1$ beyond a height of approximately ½ $h_k$. The height $h_k$ may be between $\frac{1}{10}^{th}$ $h_g$ and ½ $h_g$, where the height $h_g$ denotes the total radial height of the support element 144. It should be pointed out that all of the ribs may have the same thickness.

Furthermore, it can be seen from FIG. 3C that the outer ring 143 is arranged farther to the right axially than the inner ring 168, so that the support plate 146 has an S shape in the radial section. The outer ring 143 here is thus arranged downstream with respect to the inner ring 168. The outer ring 143 may also be arranged upstream with respect to the inner ring 168. It is also conceivable for the two rings 143 and 168 not to have any axial offset.

In this second exemplary embodiment, the radial outer end of the support plate 146 is flush with the outer ring 143, and the radial inner end 147 of the support plate 146 is flush with the inner ring 168. However, as an alternative, the support plate 146 may also protrude radially beyond at least one of the rings 143, 168.

Figure 4A:
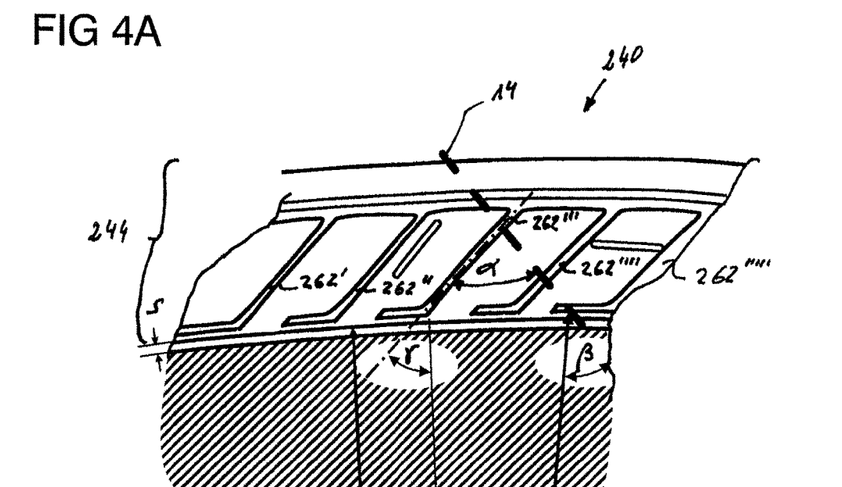
FIGS. 4A-4B show a support ring in a third embodiment according to the invention.
Figure 4B:
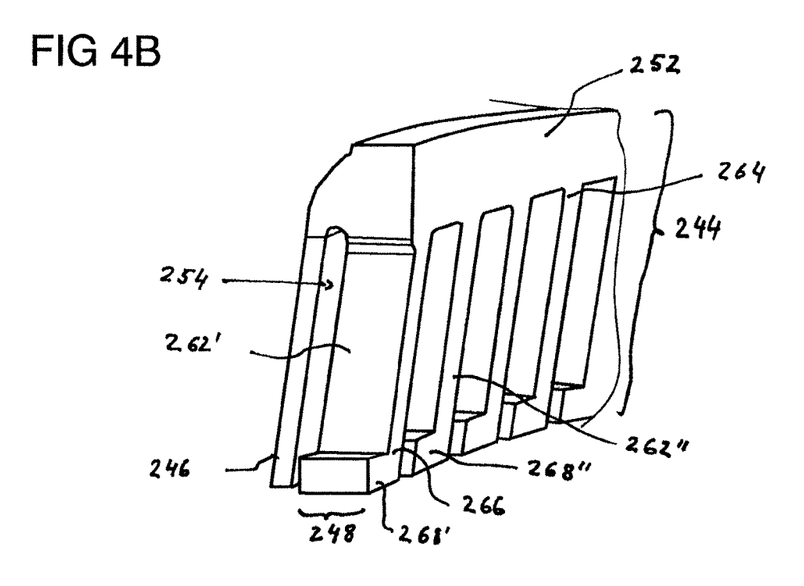

FIGS. 4A and 4B show a support ring 240 according to the invention, with a support element 244 according to a third embodiment. A mounting plate may be present but is not shown in FIGS. 4A and 4B. The support element 244 comprises the support structure 248 and the support plate 246. The support structure 248 has a plurality of ribs 262', etc., running radially inward in first approximation, such that each end 264 of the ribs 262', etc., pointing radially outward is integrally molded on the radially outer end 252 of the support structure 248. In this third embodiment, each inwardly protruding end 266 of the rib 262', etc., has its own separate inner cover band 268' etc. The first rib 262' is thus assigned to a first inner cover band 268', and the second rib 262" is assigned to a second inner cover band 268", etc. In the exemplary embodiment shown here, each individual rib 262' etc., may be flush with the corresponding inner cover band 268' etc. on the inside radially. This results in individually separate L-shaped lamellae with the individual ribs 262', etc., and the individual inner cover bands 268', etc. These lamellae are the support structure 248. An annular clearance 254 may be provided between the support structure 248 and support plate 246. The difference between the support structure 48 of the first embodiment and the support structure 248 of the third embodiment lies in the fact that the inner ring 68 is segmented, so that it develops into individual separate inner cover bands 268' accordingly.

Figure 5:
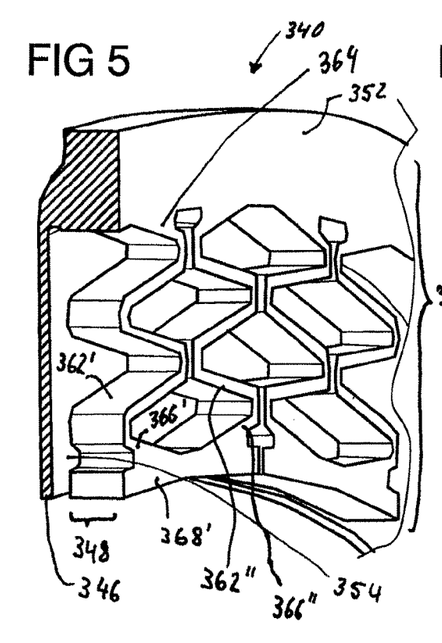
FIG. 5 shows a support ring in a fourth embodiment according to the invention.

FIG. 5 shows an oblique partial view of a support ring 340 according to a fourth embodiment. This fourth embodiment differs from the third embodiment only in the design of the support structure. This support ring 340 comprises a support element 344. The support element 344 has a support structure 348 and a support plate 346. An annular clearance 354 may be provided between the support structure 348 and the support plate 346. The support structure 348 comprises a plurality of zigzag-shaped ribs 362' etc. and ribs protruding radially inward and a plurality of separate inner cover bands 368' etc., where the inner ends 366' and 366" of two ribs 362' and 362" each share an inner cover band 368' and are integrally molded thereon. The radially outer ends 364 of all ribs are integrally molded on the outer ring 352. This forms a structure which is stiff in one axial direction but is elastic in the radial direction.

FIG. 6 shows an oblique partial view of a support ring 440 according to a fifth embodiment. In contrast with the fourth embodiment, two v-shaped ribs 462' and 462" protruding radially inward and having an inner cover band 468' extending in the circumferential direction form a hexagonal honeycomb structure. The support structure 448 has a plurality of such honeycombs which are arranged one after the other in the circumferential direction and are integrally molded here on a single outer cover band 452 which is arranged radially beneath the mounting plate 442. An annular clearance may be provided between the support plate 446 and the support structure 448. In this concrete exemplary embodiment, however, the honeycombs are in direct contact with the support plate 446 but without being connected to it. The support structure 448 may be made of a different material than the support plate 446.

FIG. 7 shows a section through a support ring 540 according to a sixth embodiment. The sectional plane according to FIG. 7 comprises the axis of rotation (not shown here) of the rotor of the gas turbine. A radial extension 570 made of an abrasion-capable material is applied to the lateral surface 547, which faces radially inward from the support plate 546. It is also conceivable for the support plate 546 to be made of an abrasion-capable material. Before the initial operation of the brush seal, the extension 570 may almost completely cover the clearance between the rotor and the stator of the gas turbine, i.e., the extension 570 may protrude almost exactly as far radially inward as the bristle ends 25, which scrape by the rotor of the gas turbine (not shown). In initial operation of an engine, only the required region of the extension 570 is worn away, so that the clearance between the lateral surface of the extension 570 facing radially inward and the surface of the rotor is relative small. In addition, a support structure 548 made of an abrasion-capable material may also be provided, this support structure being arranged downstream from the support plate 546.

LIST OF REFERENCE NUMERALS

- 2 brush seal
- 4 support ring
- 6 holding plate
- 8 outer region of 4 and 6
- 10 inner region of 4 and 6
- 12 receptacle
- 14 bristles
- 16 wire ring
- 18 clamping ring
- 20 support element
- 21 lateral surface of 20
- 22 mounting plate
- 24 L-shaped stator
- 25 inner end of 14
- 26 rotor
- 28 middle region of 14
- 30 surface of 26
- 40 support ring (first embodiment)
- 41 inner corner of 42
- 42 mounting plate
- 43 outer end of 44
- 44 support element
- 46 support plate
- 47 lateral surface
- 48 support structure
- 50 outer end of 46
- 52 outer end of 48
- 54 annular clearance between 46 and 48
- 56 slot
- 62 rib
- 64 outer end of the ribs
- 66 inner end of the ribs
- 68 inner ring
- 140 support ring (second embodiment)
- 143 outer ring
- 144 support element
- 146 support plate
- 147 lateral surface
- 148 support structure
- 149 press element
- 156' slot
- 162' rib
- 164 outer end the of ribs
- 166 inner end of the ribs
- 167' compartment
- 168 inner ring
- 240 support ring (third embodiment)
- 244 support element
- 246 support plate
- 248 support structure
- 252 outer end of 248
- 254 ring clearance between 46 and 48
- 256' etc. slot
- 262' etc. ribs
- 264 outer end of the ribs
- 266 inner end of the ribs
- 268 inner cover band
- 340 support ring (fourth embodiment)
- 344 support element
- 346 support plate
- 348 support structure
- 352 outer ring
- 354 ring clearance between 46 and 48
- 362' etc. ribs
- 364 outer end of the ribs
- 366 inner end of the ribs
- 368' inner cover band
- 440 support ring (fifth embodiment)
- 442 mounting plate
- 446 support plate
- 448 support structure
- 452 outer cover band
- 462' etc, ribs
- 468' etc. inner cover band
- 540 support ring (sixth embodiment)
- 546 support plate
- 547 lateral surface
- 548 support structure
- 570 extension
- $h_g$ total height of support element
- $d_{1,2}$ thickness of ribs
- $R_A$ radii
- $R_{SP}$ radii
- $R_{SS}$ radii
- S distance between rotor and support plate The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brush seal for a gas turbine, comprising:
a support ring, wherein the support ring is comprised of a mounting plate and a support element, wherein a radial inner end of the mounting plate is integral with or integrally molded onto a radial outer end of the support element and wherein the support element has a support plate and a support structure, wherein the support structure is arranged downstream in a direction of flow with respect to the support plate and wherein a clearance is defined between the support structure and the support plate; and bristles which are arranged upstream in the direction of flow with respect to the support ring and wherein ends of the bristles protrude radially inward beyond the support plate.

2. The brush seal according to claim 1, wherein the support structure runs parallel to the support plate.

3. The brush seal according to claim 1, wherein the support structure has ribs disposed in a plane running radially and wherein the ribs are inclined in at least a section by an angle ($\beta$) to a radial direction, wherein the angle ($\beta$) is between 10° and 40°.

4. The brush seal according to claim 3, wherein the bristles form an angle ($\gamma$) of 40° to 60° to the radial direction.

5. The brush seal according to claim 3, wherein at least one of the ribs is a spring and/or at least one of the ribs runs in a straight line.

6. The brush seal according to claim 3, wherein an inner cover band is integrally molded on a radially directed inward end of at least one of the ribs.

7. The brush seal according to claim 1, wherein the support plate and/or the support structure is disposed with an axial offset relative to the mounting plate.

* * * * *